(12) United States Patent
Pelken et al.

(10) Patent No.: US 8,282,236 B2
(45) Date of Patent: Oct. 9, 2012

(54) WIND POWERED DEVICE

(75) Inventors: Paul M. Pelken, Syracuse, NY (US); Thong Dang, Fayetteville, NY (US)

(73) Assignee: Syracuse University, Syracuse, NY (US)

( * ) Notice: Subject to any disclaimer, the term of this patent is extended or adjusted under 35 U.S.C. 154(b) by 283 days.

(21) Appl. No.: 12/720,697

(22) Filed: Mar. 10, 2010

(65) Prior Publication Data

US 2010/0220466 A1  Sep. 2, 2010

Related U.S. Application Data

(63) Continuation-in-part of application No. 12/059,231, filed on Mar. 31, 2008, now Pat. No. 7,824,060.

(51) Int. Cl.
*F21S 9/03* (2006.01)
(52) U.S. Cl. .......................... 362/183; 362/192
(58) Field of Classification Search ............. 362/183, 362/192; 290/55, 44
See application file for complete search history.

(56) References Cited

U.S. PATENT DOCUMENTS

| | | | |
|---|---|---|---|
| 4,200,904 A | 4/1980 | Doan | |
| 6,661,113 B1 | 12/2003 | Bonin | |
| 7,008,171 B1 * | 3/2006 | Whitworth | 415/4.2 |
| 7,102,249 B2 * | 9/2006 | Wobben | 290/54 |
| 2009/0244890 A1 | 10/2009 | Pelken et al. | |

FOREIGN PATENT DOCUMENTS

| | | |
|---|---|---|
| CN | 200975626 | 12/2007 |
| CN | 200986132 | 12/2007 |
| FR | 2809477 | 11/2001 |
| GB | 2415750 | 4/2006 |
| JP | 08138422 | 5/1996 |
| JP | 2003042052 | 2/2003 |
| KR | 1020060082108 | 7/2006 |
| RU | 2283985 | 9/2005 |
| WO | 02/33311 | 4/2002 |
| WO | 03/004777 | 1/2003 |
| WO | 2006/022590 | 3/2006 |
| WO | 2007/113498 | 10/2007 |

OTHER PUBLICATIONS

Green Energy Consulting and Supply, LLC www.whesinc.com.
SunrainVision www.sunrainvision.com.
Street Lighting from wind and sun! www.alternativeenergyhq.com.
Success Sun Lamp www.success1313.com.

* cited by examiner

*Primary Examiner* — Sharon Payne
(74) *Attorney, Agent, or Firm* — David L. Nocilly; Bond Schoeneck & King

(57) ABSTRACT

A light fixture including a turbine generator having one or more vertical-axis wind turbines (VAWTs) for generating energy and a plate located above and/or below each turbine for focusing and converging the wind inwardly. The plate is aerodynamically-designed to converge the wind onto the turbine and provide a strong wind current. The turbine generator is incorporated into a light fixture to provide self-sustaining light energy. Solar panels may be provided in conjunction with the turbine generator to provide an additional source of energy and a controller is included to manage the flow of electricity and ensure that the light fixture is powered during periods of darkness.

8 Claims, 18 Drawing Sheets

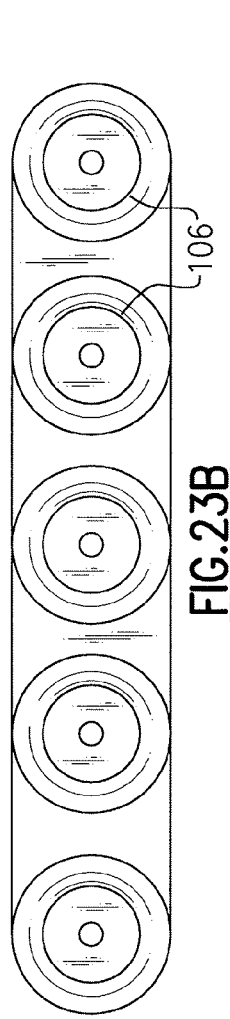
FIG.23B
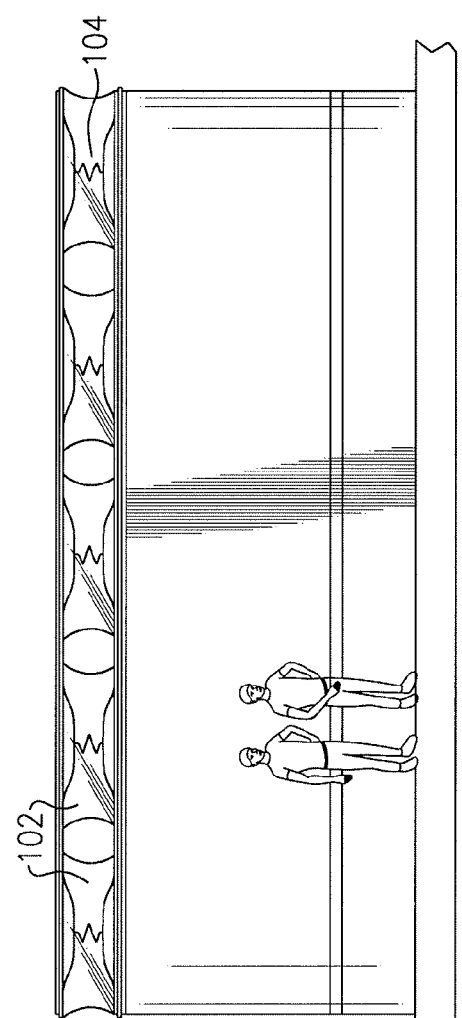
FIG.23C
FIG.23A

WIND POWERED DEVICE

CROSS-REFERENCE TO RELATED APPLICATIONS

The present application is a continuation-in-part of U.S. application Ser. No. 12/059,231, entitled WIND POWERED DEVICE and filed Mar. 31, 2008, which is hereby expressly incorporated by reference herein.

BACKGROUND OF THE INVENTION

1. Field of the Invention

The present invention relates generally to energy saving devices and, more particularly, to wind powered and solar powered devices.

2. Description of the Related Art

Sustainability is the basic characteristic of a process or a state that can be maintained at a certain level indefinitely. For our planet, it is the intent to provide the best outcomes for the human and natural environments both now and into the indefinite future. The Brundtland Commission, formally the World Commission on Environment and Development (WCED), known by the name of its Chair Gro Harlem Brundtland, was convened by the United Nations in 1983. The commission was created to address growing concern about the accelerating deterioration of the human environment and natural resources as well as the consequences of that deterioration for economic and social development. In establishing the commission, the UN General Assembly recognized that environmental problems were global in nature and determined that it was in the common interest of all nations to establish policies for sustainable development. The Commission defined sustainable development as a development that "meets the needs of the present without compromising the ability of future generations to meet their own needs." (WCED 1987). The complex term of sustainability relates to the continuity of economic, social, institutional and environmental aspects of human society, as well as the non-human environment.

Alternate energy devices have been developed over the years. Many solar powered and wind driven devices in the industry lack efficiency. Wind driven devices typically require high wind velocities to produce high rotation speeds in order to maintain a constant energy supply. Such speed requirement typically precludes efficient use of wind driven devices in areas in which relatively low wind velocities are present. Additionally, many wind driven devices must be oriented in a certain direction to maintain high rotation speeds.

BRIEF SUMMARY OF THE INVENTION

It is therefore a principal object and advantage of the present invention to provide a highly efficient, wind powered and solar powered device.

It is another object of the invention to provide wind powered and solar powered devices that are fully self-sustaining and do not need to be connected to existing infrastructures.

It is a further object of the invention to provide a light powered by wind and/or solar energy and requires little or no additional energy.

It is yet another object of the invention to provide an energy efficient light that can be used in a variety of different buildings and structures.

Other objects and advantages of the present invention will in part be obvious, and in part appear hereinafter.

These and other objects and advantages are accomplished by a turbine generator having one or more wind turbines for generating energy and a series of plates located above and below each turbine for focusing and converging the wind inwardly. The plates are aerodynamically-designed to converge the wind onto the turbine and provide a strong wind current.

In another aspect of the invention, the turbine generator is incorporated into a light fixture to provide self-sustaining light energy. In yet another aspect of the invention, solar panel are provided in conjunction with the turbine generator to provide an additional source of energy.

In another aspect of the invention, the present invention provides a light fixture which comprises the following: (i) one or more Savonius wind turbines for generating energy; (ii) a series of plates located above and below each of the one or more turbines; (iii) a light assembly comprising one or more lights; (iv) a solar assembly adapted for collecting solar radiation; (v) an electrical energy generator operationally coupled to the turbine generator for converting the wind energy to electrical energy and operationally coupled to the solar assembly for converting the solar radiation into electricity; and (vi) a power storage assembly coupled to the electrical energy generator and the light assembly for providing power to the light assembly.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 23 is a perspective view of an alternate embodiment of the turbine generator of the present invention used in a bus shelter;

DETAILED DESCRIPTION OF THE INVENTION

Figure 1:
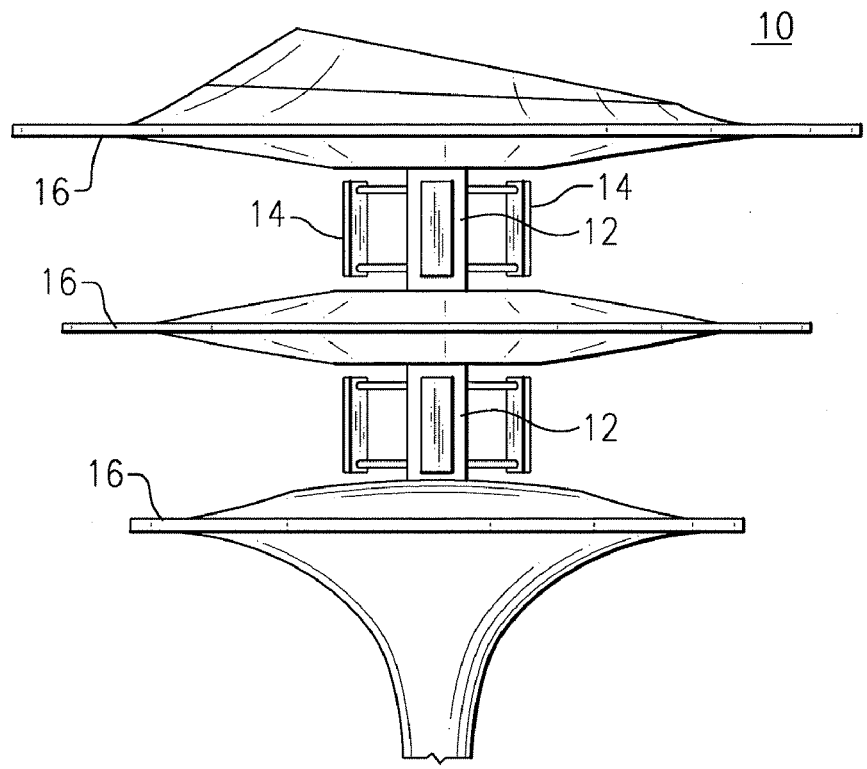
FIG. 1 is a perspective view of the turbine generator of the present invention.
Figure 2:
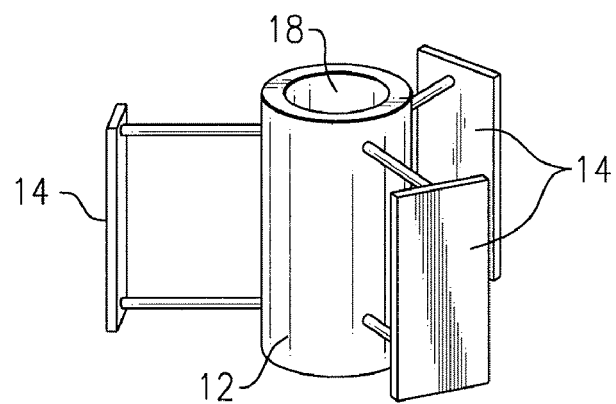
FIG. 2 is a perspective view of the rotary shaft of the turbine generator of FIG. 1.

As will be appreciated, the present invention provides a wind turbine generator 10 having one or more rotary shafts 12, as shown in FIG. 1. Rotary shafts 12 rotate about a rod or pole in either a clockwise or counterclockwise direction. As clearly shown in FIG. 2, rotary shaft 12 has a channel or opening 18 for fitting onto a pole or rod, for rotation thereabout.

Each rotary shaft 12 has a series of blades 14 that react to the wind current to rotate rotary shaft 12. Plates 16 are located above and below each rotary shaft 12. Plates 16 are designed aerodynamically to promote convergence of the wind inward toward blades 14. Plates 16 are shown as circular or disc-shaped, although other shapes may be used as long as the aerodynamic effect is achieved. The central portion of plates 16 is greater in thickness, which thickness is substantially constant and begins to taper off to a point proximate the edge. The peripheral edge around the perimeter of plate 16 is very thin. The shape of plates 16 attracts air current. The force of the air current or wind drives blades 14 to rotate rotary shaft 12, thereby generating energy. The thin edge of plates 14 allows for a high volume of wind as it flows towards the rotary shaft. The wind turbine generator 10 is also impervious to the changing wind direction.

Figure 3:
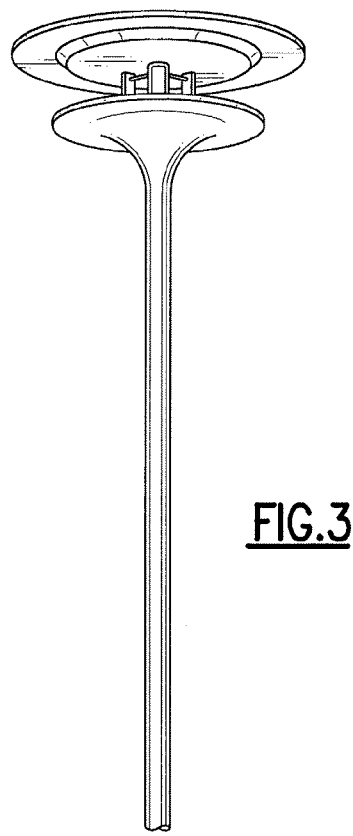
FIG. 3 is a perspective view of an embodiment of a street light with the turbine generator of the present invention.
Figure 4:
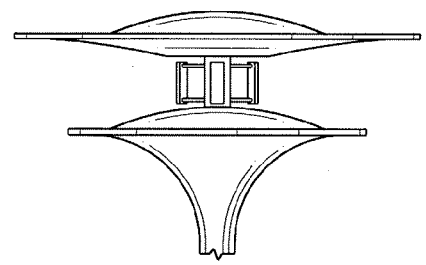
FIG. 4 is a perspective view of the plates in the turbine generator of FIG. 3.
Figure 5:
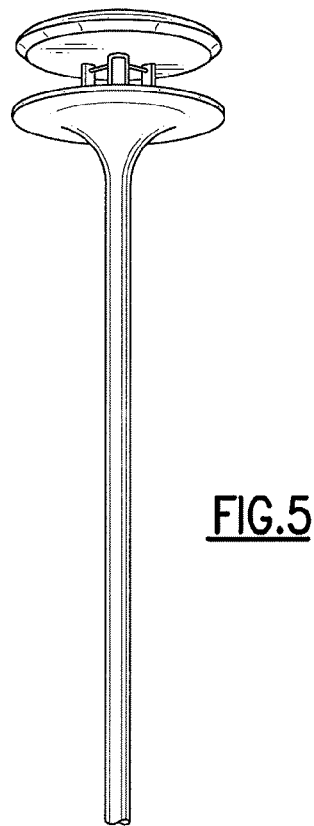
FIG. 5 is a perspective view of an alternate embodiment of a street light with the turbine generator of the present invention.
Figure 6:
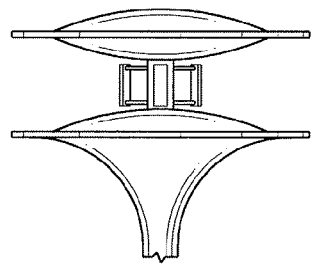
FIG. 6 is a perspective view of the plates in the turbine generator of FIG. 5.
Figure 7:
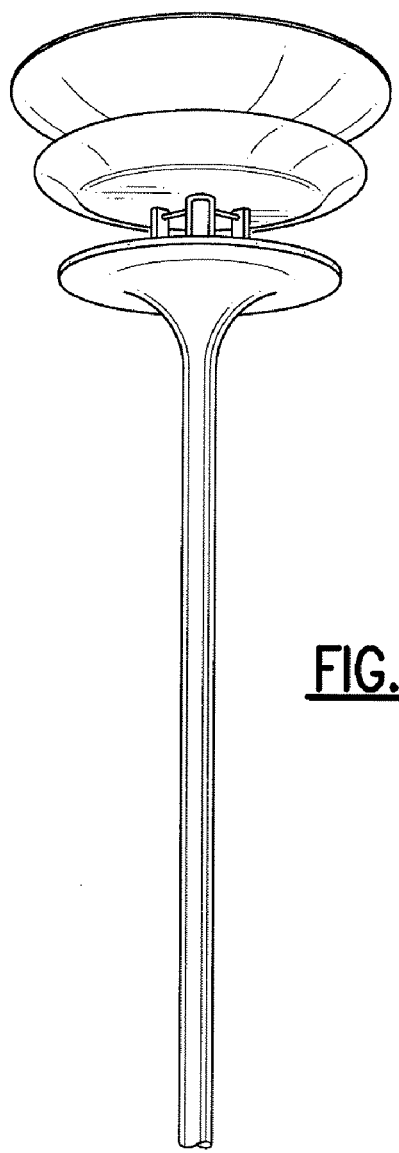
FIG. 7 is a perspective view of an alternate embodiment of a street light with the turbine generator of the present invention.
Figure 8:
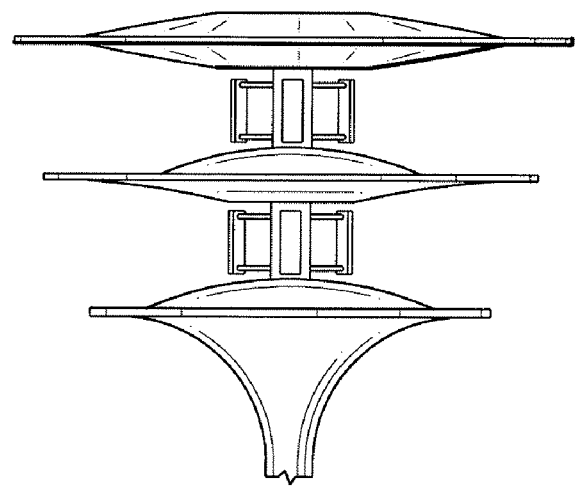
FIG. 8 is a perspective view of the plates in the turbine generator of FIG. 7.
Figure 9:
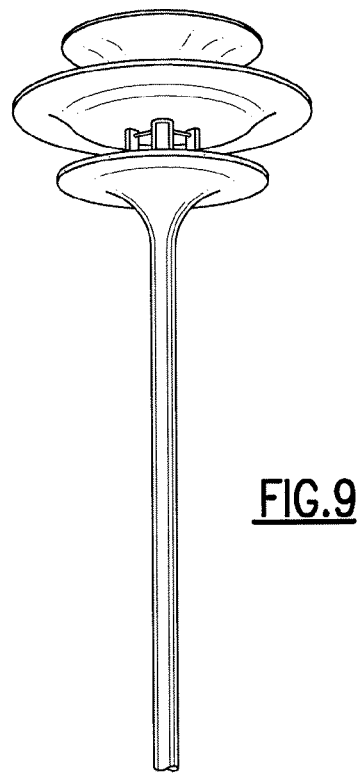
FIG. 9 is a perspective view of an alternate embodiment of a street light with the turbine generator of the present invention.
Figure 10:
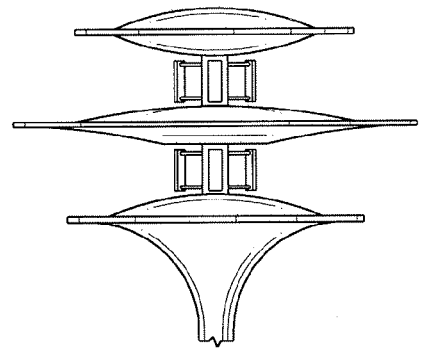
FIG. 10 is a perspective view of the plates in the turbine generator of FIG. 9.
Figure 11:
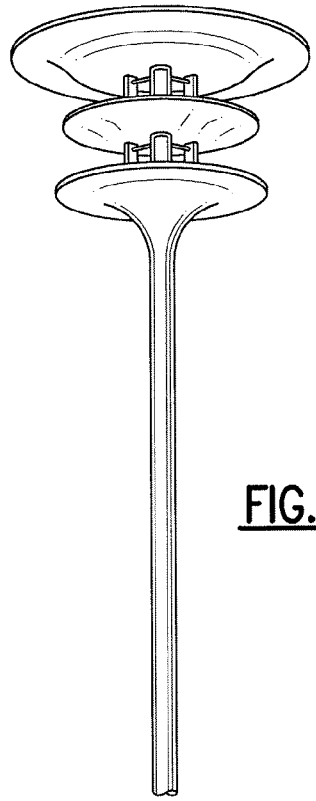
FIG. 11 is a perspective view of an alternate embodiment of a street light with the turbine generator of the present invention.
Figure 12:
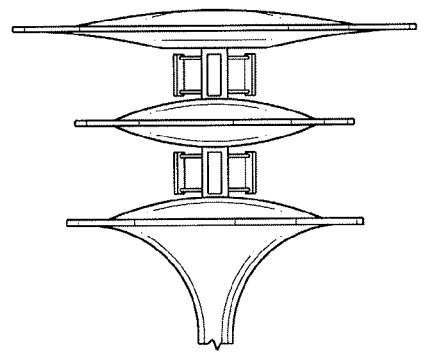
FIG. 12 is a perspective view of the plates in the turbine generator of FIG. 9.

One preferred embodiment is directed to the use of wind turbine generator 10 in a light. FIGS. 3 through 12 illustrate various turbine assemblies for incorporation in a light fixture. FIGS. 3 and 5 show a rotary shaft with blades positioned between an upper and lower plate. FIG. 4 shows a front plan view of the plates used in the generator of FIG. 3, with the top plate being larger than the bottom plate. FIG. 6 shows a front plan view of the plates used in the generator of FIG. 5, with the top plate being slightly smaller than the bottom plate. All of the plates have the same aerodynamic shape represented by a thicker central region and much thinner periphery to guide and converge the wind current inward toward the blades.

FIGS. 7 through 12 illustrate various turbine assemblies having two wind turbines each positioned between two plates for a total of three plates. Even though the plates may vary in size and location, all of the plates have the same aerodynamic shape to provide strong and consistent air current for movement of the blades and rotation of the rotary shaft.

Figure 13:
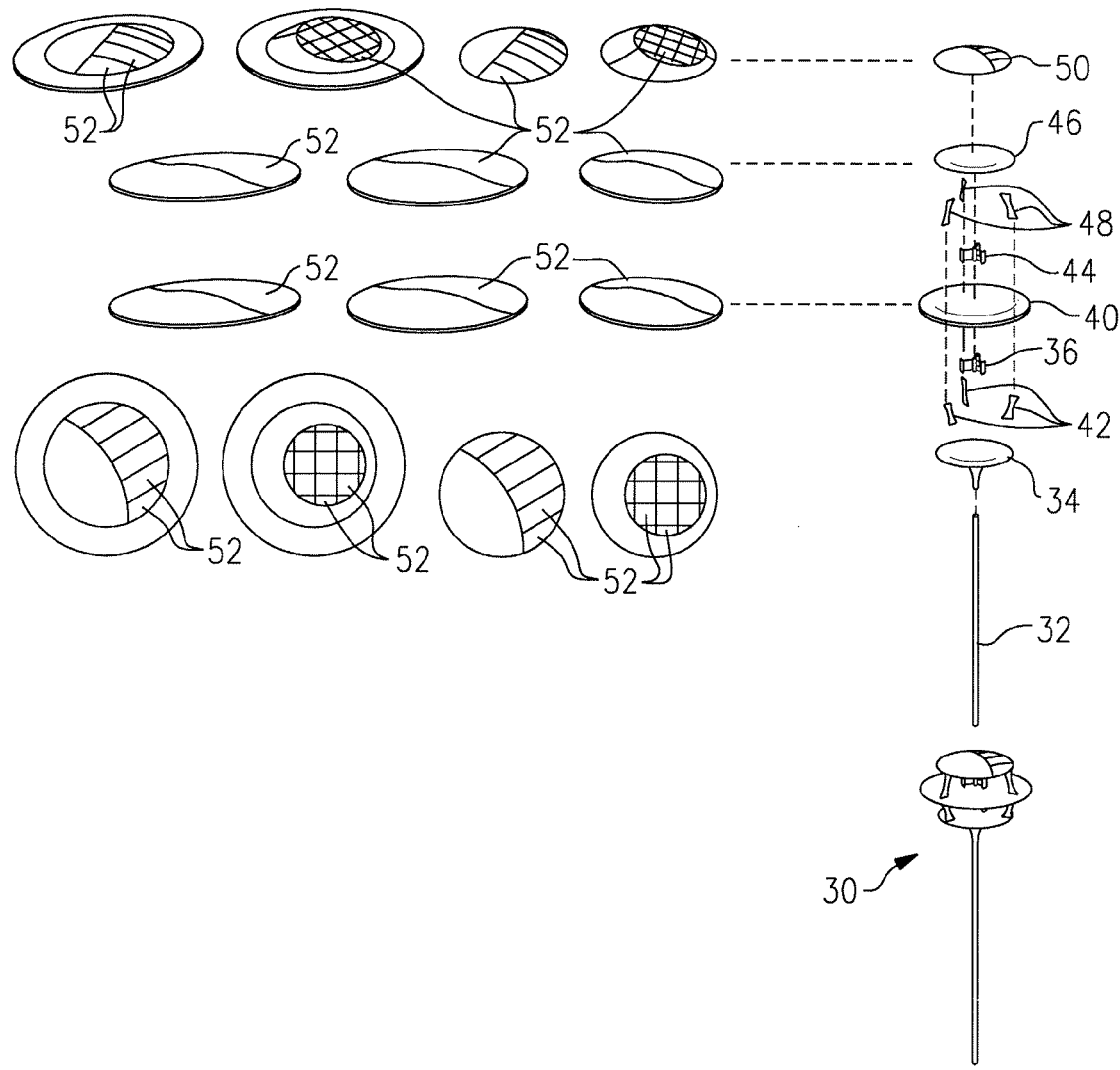
FIG. 13 is an exploded view of an embodiment of a street light with the turbine generator of the present invention.
Figure 14:
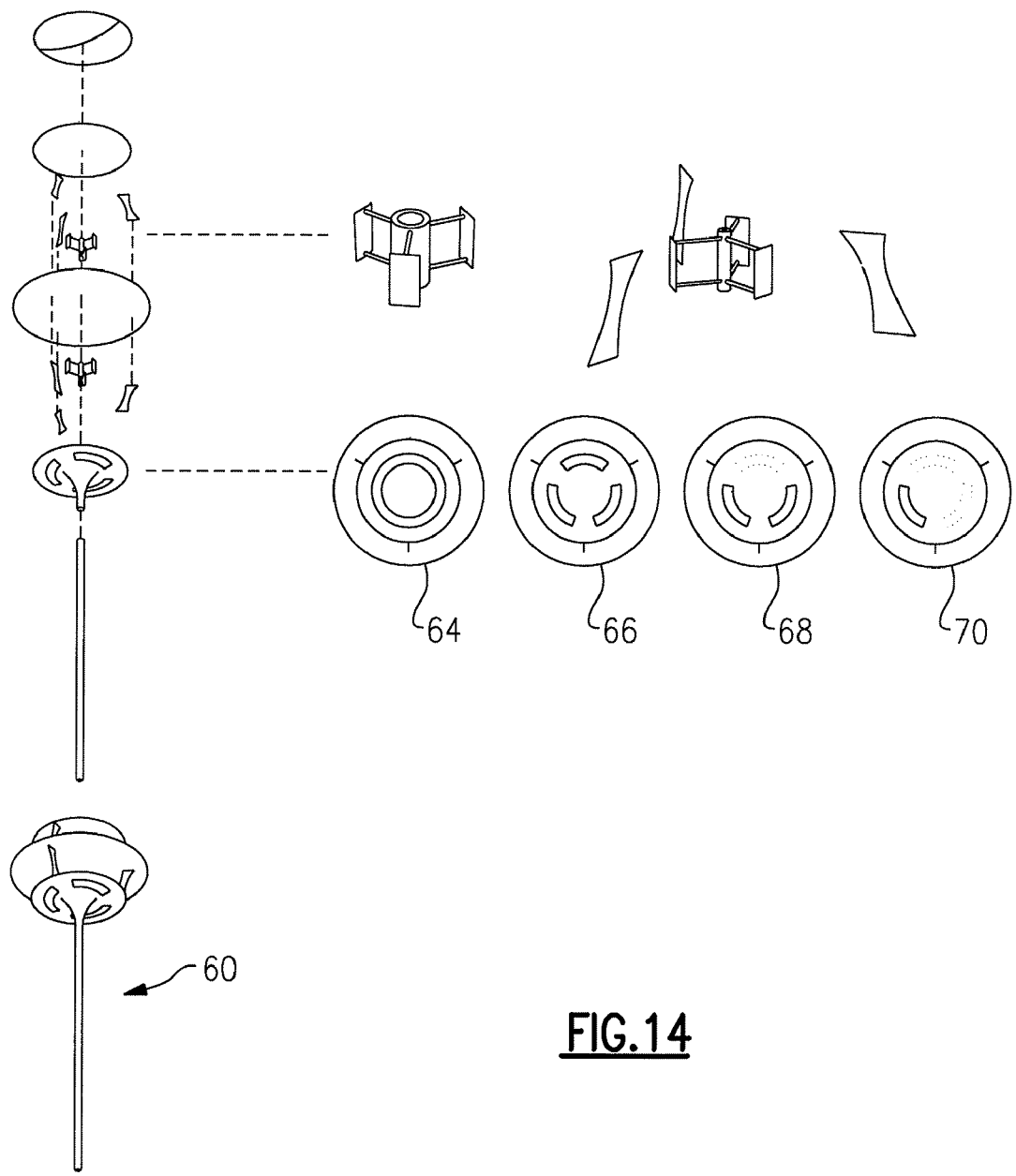
FIG. 14 is an exploded view of an alternate embodiment of a street light with the turbine generator of the present invention.
Figure 15:
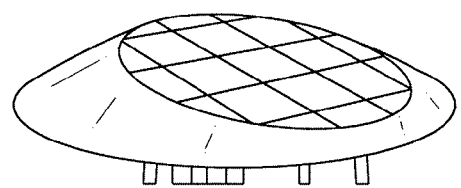
FIG. 15 is a perspective view of a plate in the turbine generator of the present invention with a solar energy panel assembly.
Figure 16:
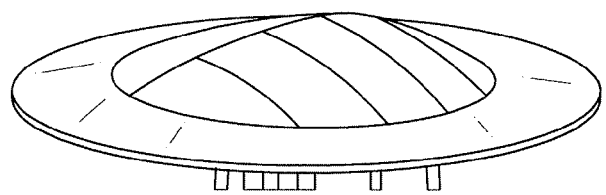
FIG. 16 is a perspective view of an alternate embodiment of a plate in the turbine generator of the present invention with a solar energy panel assembly.
Figure 17:
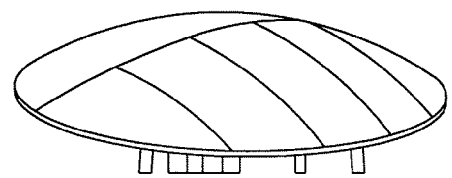
FIG. 17 is a perspective view of an alternate embodiment of a plate in the turbine generator of the present invention with a solar energy panel assembly.
Figure 18:
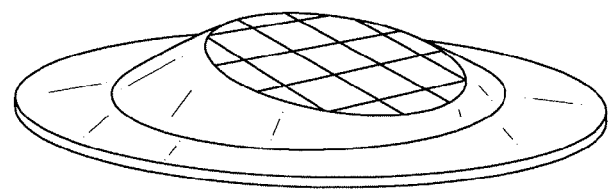
FIG. 18 is a perspective view of an alternate embodiment of a plate in the turbine generator of the present invention with a solar energy panel assembly.
Figure 22:
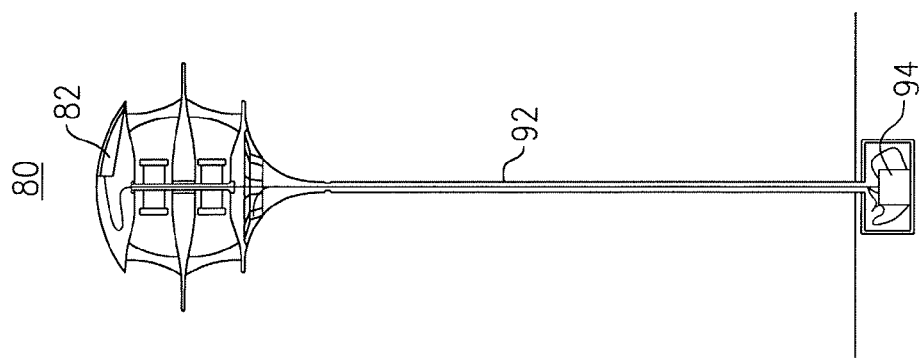
FIG. 22 is perspective view of a street light with a turbine generator of the present invention showing the storage of the mechanics and the wiring of the light.
Figure 21:
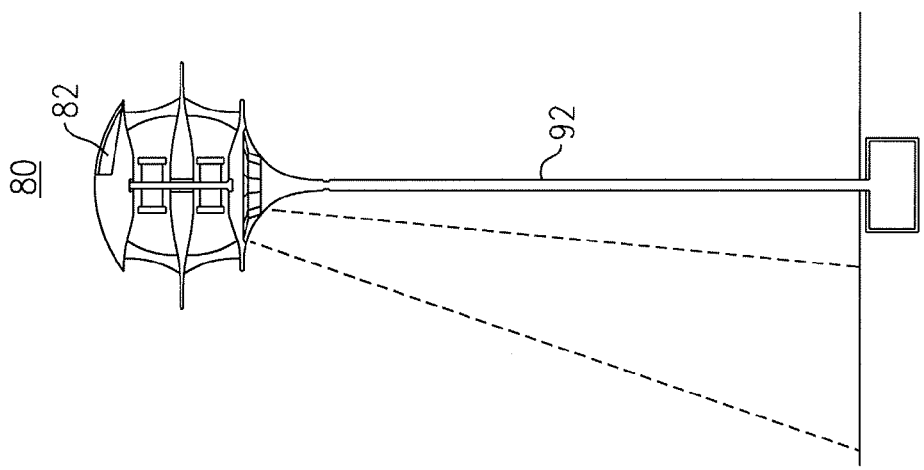
FIG. 21 is a perspective view of a street light with a turbine generator of the present invention showing energy transferred to a streetlight.
Figure 20:
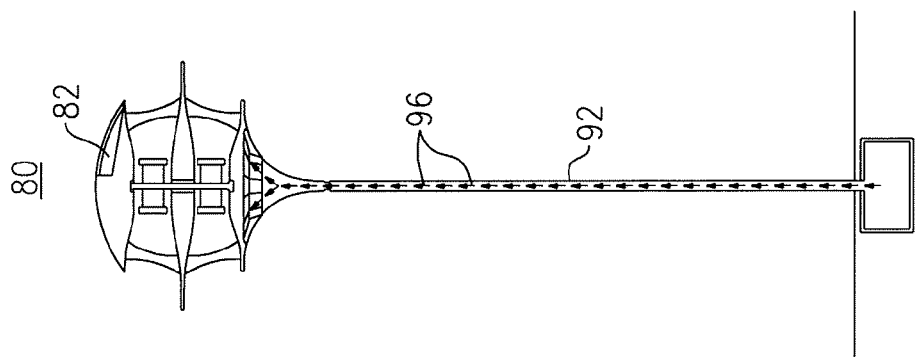
FIG. 20 is a perspective view of a street light with a turbine generator of the present invention showing stored energy delivered to a streetlight.
Figure 19:
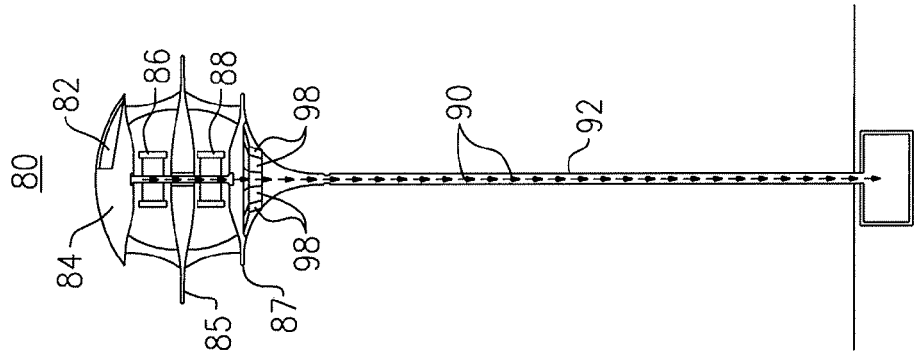
FIG. 19 is a perspective view of a street light with a turbine generator of the present invention showing solar energy absorption.

FIGS. 13 and 14 are exploded views of various embodiments of wind generator assemblies of the present invention. FIG. 13 shows assembly 30 having a rod or pole 32 upon which a lower plate 34 is positioned. Wind turbine 36 is positioned above plate 32. A second or middle plate 40 is positioned above turbine 34. A series of fins 42 are used to support plate 40 above turbine 36. A second turbine 44 is positioned above plate 40 and a third plate 46 is positioned above turbine 44. Support fins 48 may be placed between the second and third plates to support the third plate 46. A cover 50 may be positioned on third plate 46 to protect plate 46 and also provide solar energy options. Any or all of plates 34, 40, 46 and cover 50 may have one or more solar panels 52 to provide additional energy for conversion to electrical energy. As shown in FIG. 13, there are many combinations, patterns and shapes of solar panels that can be used in the plates and cover herein.

FIG. 14 shows yet another option for a wind turbine assembly 60 for use as a light. Two turbines are disposed between upper and lower plates. The bottom or lower plate 62 in FIG. 14 has a series of lights, such as light emitting diodes (LEDs) positioned on the bottom face of plate 62. Variations of types of lights, light positions, shapes and number of lights are also shown in FIG. 14 at 64, 66, 68 and 70. Any type of light, including but not limited to, incandescent, fluorescent, halogen and led lights, may be used as the illuminating component of the light.

FIGS. 15 through 18 shows additional embodiments of solar panels which may be used on the plates or as a cover for the light assembly. As shown, the panels may extend to the edge of the plate or cover, or may be positioned proximate the center of the plate or cover in a full or semi-circular design.

Reference is made to FIGS. 19 through 22 which illustrate the energy path and transfer in the light fixture assembly. Light assembly 80 is shown with solar panel 82 on top plate 84 and two wind turbines 86 and 88, located, respectively, between top plate 84, middle plate 85 and bottom plate 87. Energy 90 created from solar panel 82 and wind turbines 86 and 88, is converted into electrical energy by a electrical energy generator and is sent down pole 92 to a power storage assembly 94. At night, energy 96 is sent up to lights 98 for lighting the surrounding area.

FIG. 23 further illustrates and exemplifies other uses of the turbine system herein. A bus shelter 100 is shown having light assemblies 102 that incorporate the turbine assembly 104 of the present invention. LEDs 106 are used to illuminate the light, which are powered by electrical energy converted from the wind energy produced by the wind turbine. The wind turbine assembly of the present invention is useful for many of today's energy demands including lighting assemblies in a variety of locations, buildings and other structures.

Figure 24:
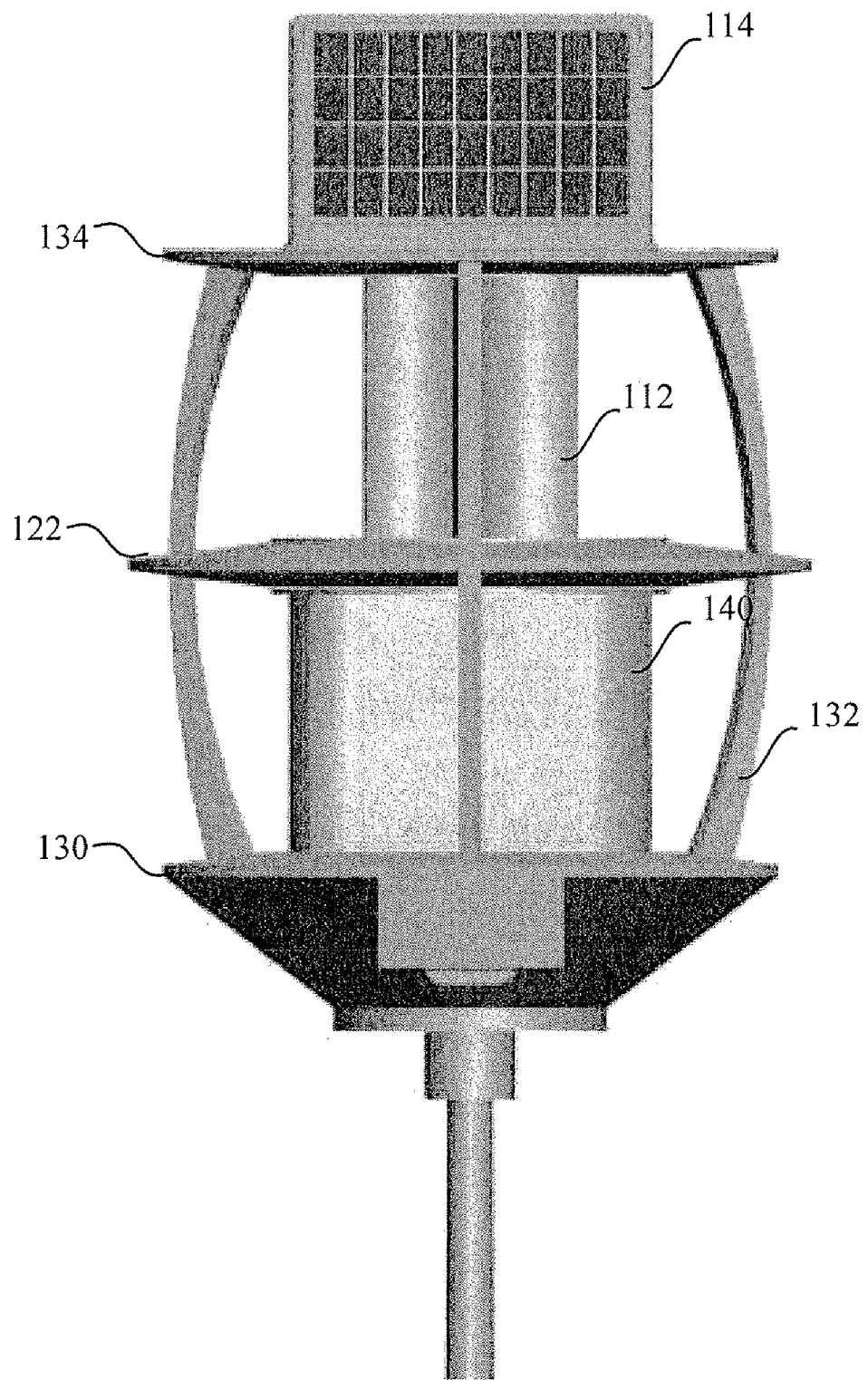
FIG. 24 is a perspective view of an alternate embodiment of the turbine generator and solar energy panel assembly of the present invention.
Figure 26:
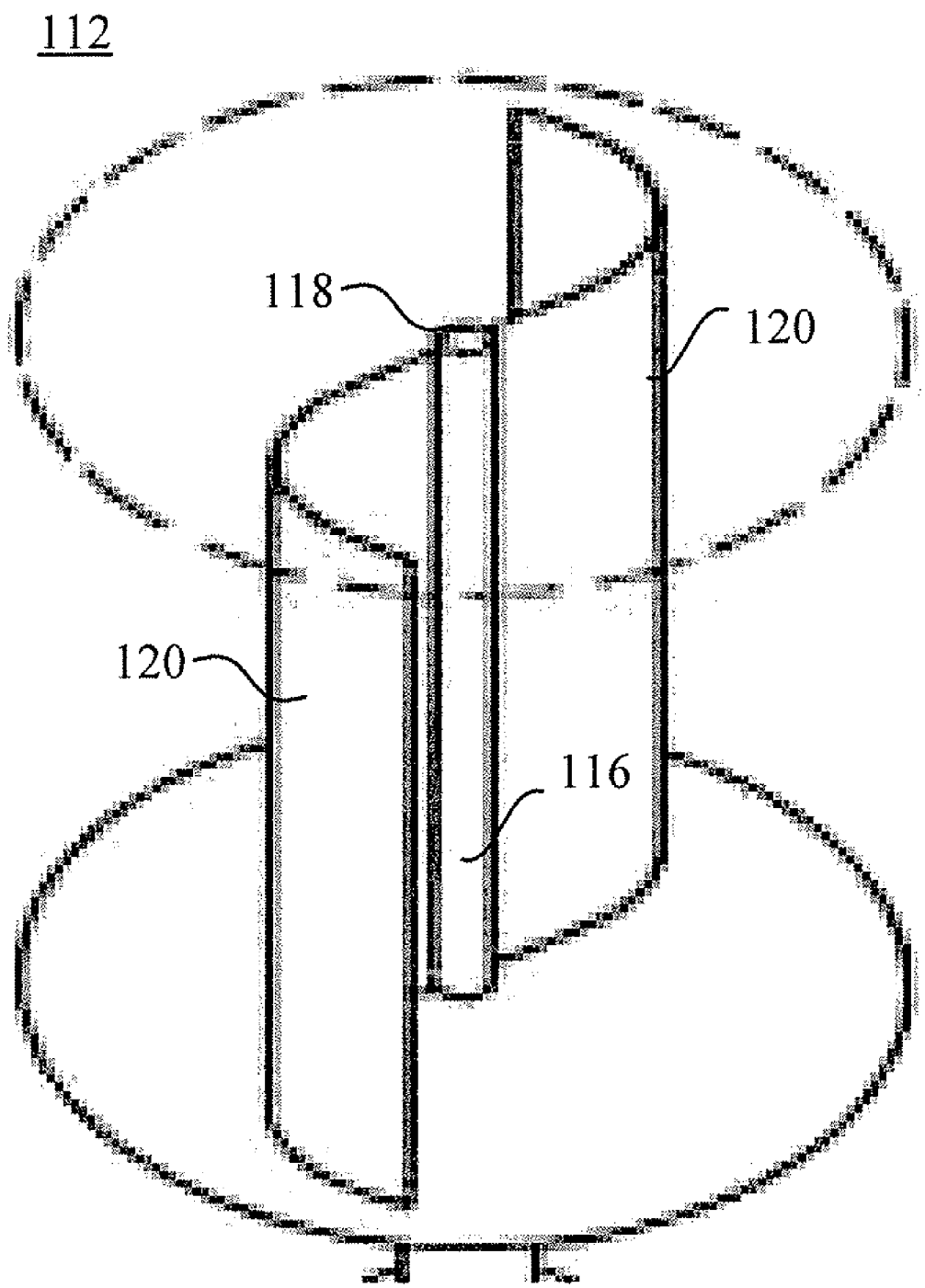
FIG. 26 is a perspective view of the turbine of the present invention.
Figure 27:
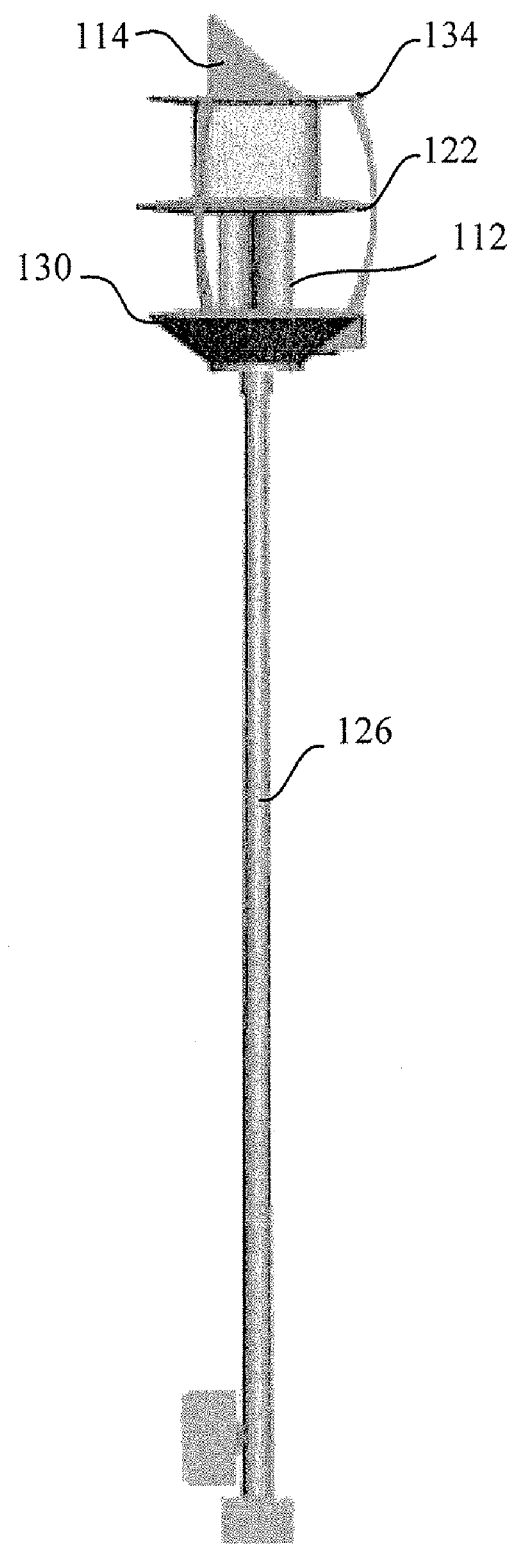
FIG. 27 is a perspective view of an embodiment of a street light with the turbine generator and solar energy panel assembly of the present invention.
Figure 28:
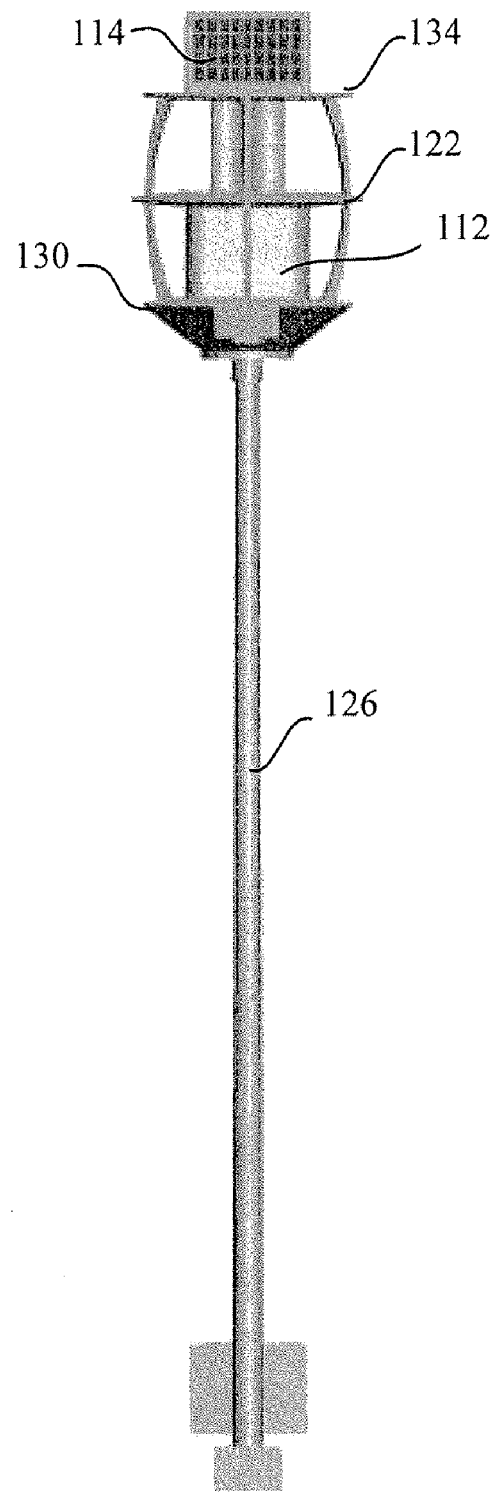
FIG. 28 is a perspective view of the street light of FIG. 27.
Figure 29:
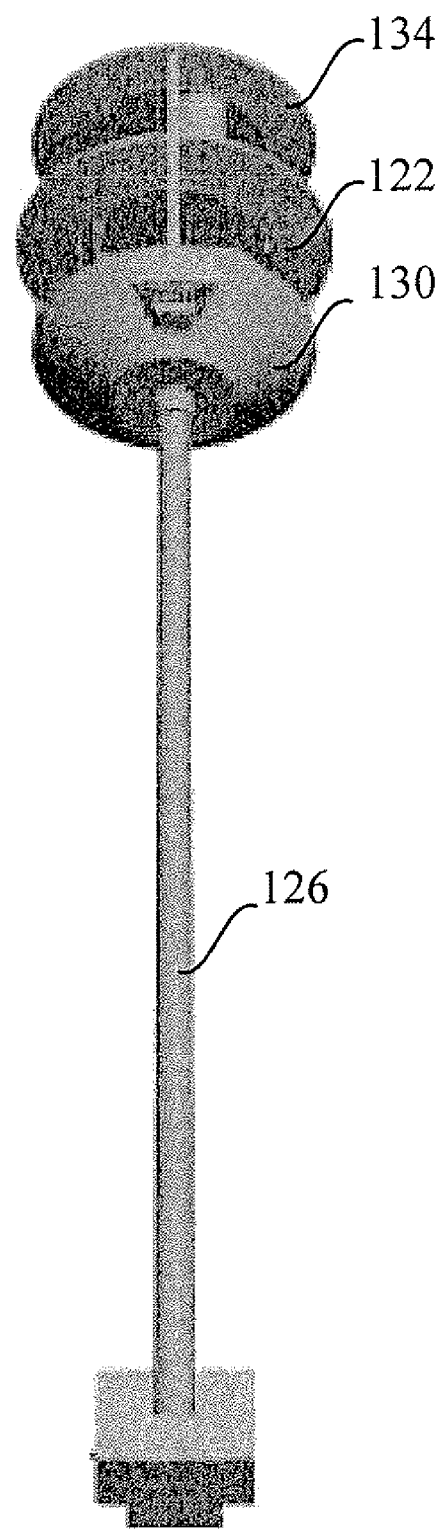
FIG. 29 is a perspective view of the street light of FIG. 27.

FIG. 24 shows another embodiment of the present invention in which light assembly 110 has a wind turbine generator 140 and a solar energy panel assembly 114. A rotary component 112 of the wind turbine generator rotates about a rod or pole in either a clockwise or counterclockwise direction. As clearly shown in the rotary component in FIG. 26, rotary shaft 116 has a channel or opening 118 for fitting onto a pole or rod, for rotation thereabout.

Figure 25:
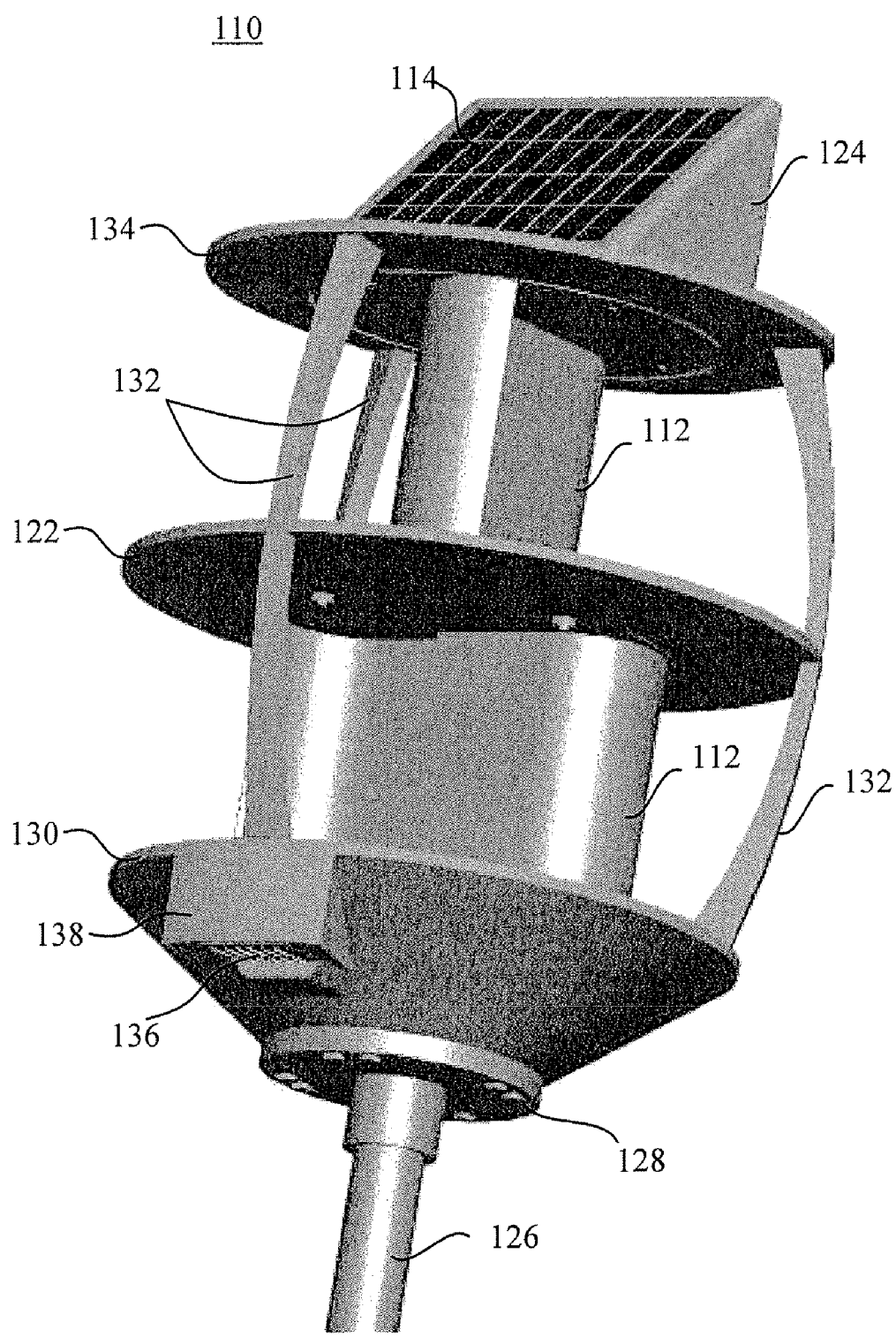
FIG. 25 is a second perspective view of an embodiment of the turbine generator and solar energy panel assembly of the present invention.

Rotary component 112 has two or more blades 120 that react to a wind current to rotate blade component 112. In one embodiment, the rotary component is a vertical-axis wind turbine ("VAWT"). In addition to providing visual aesthetics, VAWTs can accept wind from any direction, which is an advantageous feature in locations with variable wind conditions. In a preferred embodiment, rotary component 112 is a drag-based VAWT, such as a Savonius-type rotor. As shown in FIG. 25, light assembly 110 can have two rotary components 112 to generate energy.

One preferred embodiment of light assembly 110 is directed to the use of one or more plates 122 located above and/or below rotary component 112 for focusing and converging the wind inwardly. Plate 122 is aerodynamically-designed to converge the wind onto the rotary component and provide a strong wind current. Plate 122 is shown as circular or disc-shaped, although other shapes may be used as long as the aerodynamic effect is achieved. The central portion of plate 122 is greater in thickness, which thickness is substantially constant and begins to taper off to a point proximate the edge. The peripheral edge around the perimeter of plate 122 is very thin. The shape of plates 122 attracts air currents and directs them onto blades 120. The force of the air current or wind drives blades 120 to rotate around rotary shaft 118, thereby generating energy. Even though plate 122 may vary in size and location, the plate will have generally the same aerodynamic shape to provide strong and consistent air current for movement of the blades and rotation of the rotary shaft.

FIG. 25 illustrates an embodiment of solar energy panel assembly 114 in a solar pane housing 124 on the top of light assembly 110. Solar energy panel assembly 114 and housing 124 may be permanently or removably affixed to light assembly 110 by any means of attachment, including but not limited to chemical or adhesive bonding, nails, bolts, weld, screws, or rivets. In the preferred embodiment, the solar panels are tilted at an angle based on the location of the device. To maximize power production, the solar panel should be tilted at an angle approximately equal to the latitude of the site and facing within 15° of due south. The solar panel assembly 114 is optimally tilted an additional 15° in the winter and tilted less an additionally 15° in the summer in order to maximum exposure to solar radiation. Orientation of solar energy panel assembly 114 is vital, as deviation by even a single degree can result in a loss of maximum power production. Shading of solar energy panel assembly 114 by objects such as buildings or trees can also result in less than maximum power production. Although solar energy panel assembly 114 in FIG. 25 is a rigid photovoltaic panel, the panels may also be composed of flexible solar panels, individual solar cells, or any other known solar energy panel depending on the needs of the user. The photovoltaic solar panels of the preferred embodiment can produce the required amount of power in a panel size that is feasible for solar panel housing 124, is easily integrated into housing 124 as a single unit, and has a pre-designed and integrated weather-protection structure. In another embodiment, the panels may extend to the edge of a plate or cover, or may be positioned proximate the center of the plate or cover in a full or semi-circular design.

FIG. 25 shows several other components of the light assembly according to the present invention. The light assembly 110 has a rod or pole 126 upon which a brace or bracket 128 is positioned. Lower plate 130 is positioned onto and attached to bracket 128. In the embodiment shown in FIG. 25, a lower rotary component 112 is positioned above lower plate 130, although either the lower or upper rotary component may be replaced by another component (as shown in FIG. 24). A second or middle plate 122 is positioned above the lower rotary component 112, followed by an upper rotary component 112. A third plate 134 is positioned on top of upper rotary component 112. A cover (not shown) may be positioned on third plate 134 to protect the plate and also provide solar energy options. Any or all of plates 130, 122, and 134 may have one or more solar panels to provide additional energy for conversion to electrical energy. Support fins 132 may be placed on light assembly 110 to support, brace, or otherwise protect the light assembly.

FIG. 25 shows a housing 138 containing a light 136 such as a light emitting diode (LED) positioned on the bottom face of lower plate 130. Any type of light, including but not limited to, incandescent, fluorescent, halogen, and LED lights may be used as the illuminating component of the light. Housing 138 and light 136 may be permanently or removably affixed to light assembly 110 by any means of attachment, including but not limited to chemical or adhesive bonding, nails, bolts, weld, screws, or rivets. Alternatively, housing 138 and lower plate 130 may be molded as a single component during manufacturing.

Figure 30:
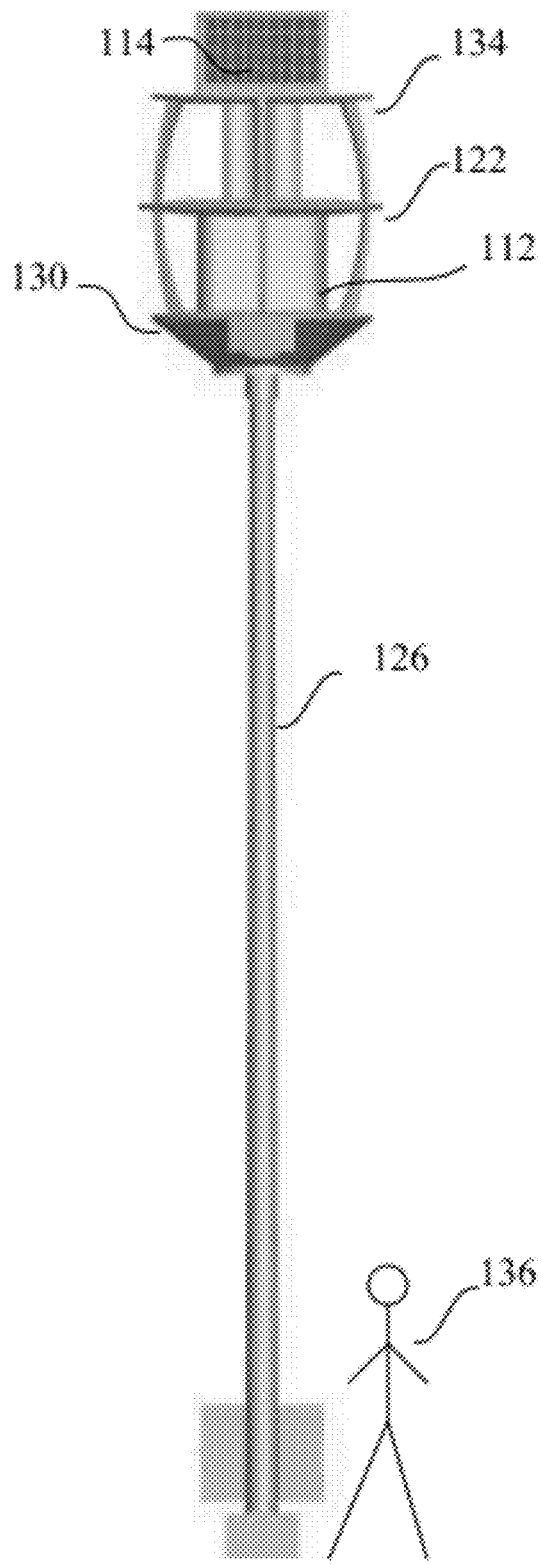
FIG. 30 is a perspective view of the street light of FIG. 27 shown to scale with a human being.

A preferred embodiment is directed to the use of a wind turbine generator and a solar energy assembly in a light assembly 110. FIGS. 27 through 30 illustrate an embodiment of a turbine assembly for incorporation in a light fixture. In each figure, light assembly 110 is positioned onto a rod or pole 126, has plates 130, 122, and 134, a rotary component 112, and a solar energy panel assembly 114. Energy created from solar panel assembly 114 and the wind turbine is converted into electrical energy by an electrical energy generator and is sent down pole 126 to a power storage assembly. At night, energy is sent up to light 136 for lighting the surrounding area. In FIG. 30, light assembly 110 is shown to scale with person 136 according to one embodiment of the invention.

Figure 31:
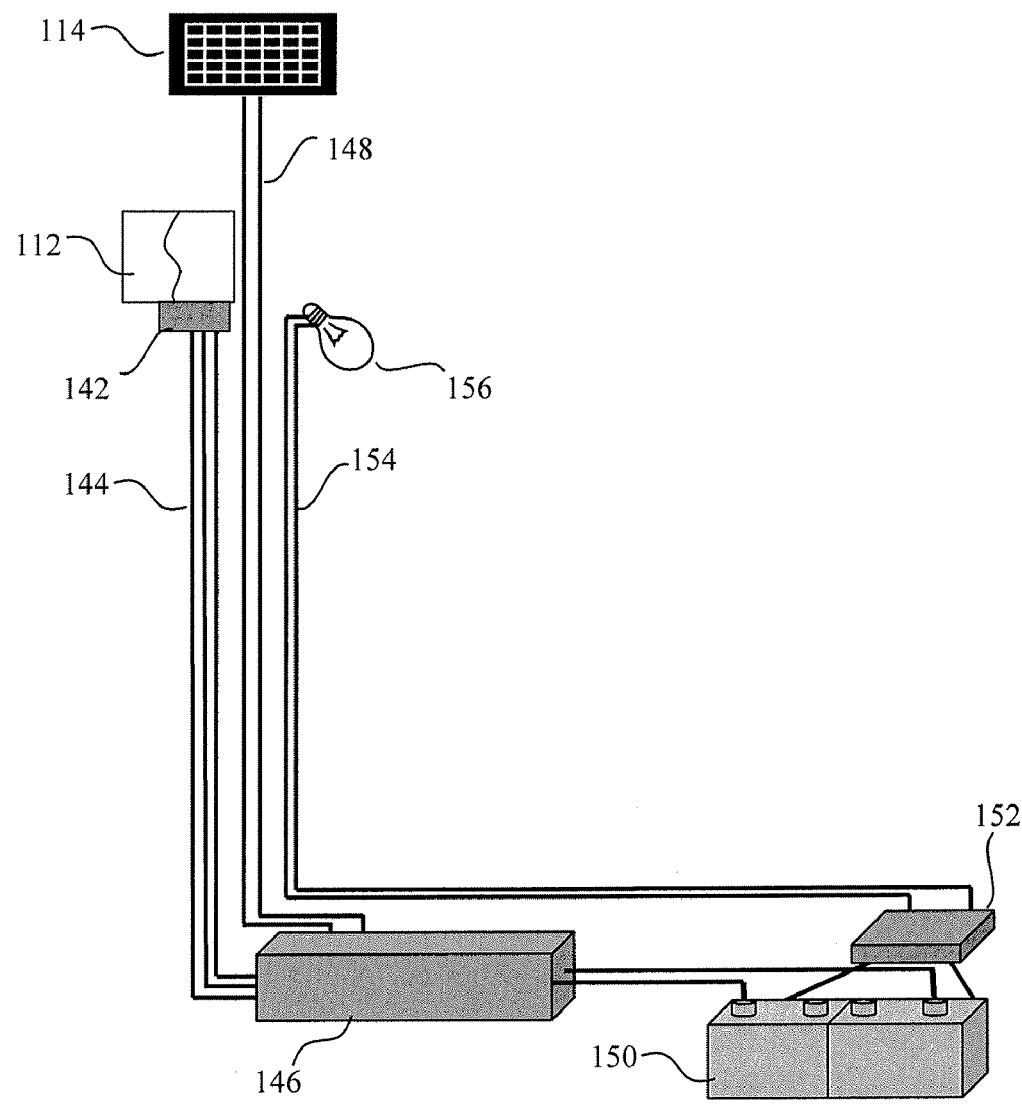
FIG. 31 is a schematic of the turbine and solar panel assembly according to one embodiment of the present invention.

FIG. 31 is a schematic, not to scale, of the turbine and solar panel assembly according to one embodiment of the present invention. To charge the batteries or provide electricity to the light during operation, rotary component 112 has two or more blades that react to a wind current to cause rotation of a shaft. Alternator 142 captures the mechanical energy of the shaft and converts it to electrical energy, preferably in the form of alternating current. The alternating current travels via insulated wires 144 to the hybrid solar/wind charge controller 146. Similarly, solar energy panel assembly 114 gathers energy from sunlight and converts the energy into electricity. The current generated by the solar panels travels via insulated wires 148 to the hybrid solar/wind charge controller 146.

Hybrid solar/wind charge controller 146 maintains the life of the battery or batteries by limiting the rate at which current can be drawn from or added to the batteries thus leading to extended battery life. In a preferred embodiment, charge controller 146 monitors the battery and when it near full charge or discharge the controller allows only an appropriate amount of current to flow, thereby preventing damage and conserving energy. Other beneficial but not essential characteristics include overcharge protection, short circuit protection, ease of use, durability, and wide operating temperature. From charge controller 146, the current enters the battery 150. Battery 150 may be composed of one or more than one individual batteries, depending on the design of the system or the needs of the user.

To power the light 156, current travels from battery 150 to inverter 152. The inverter converts the direct current from the battery to alternative current with any voltage and frequency required by light 156. From inverter 152, the current travels via insulated wires 154 to light 156.

Figure 32:
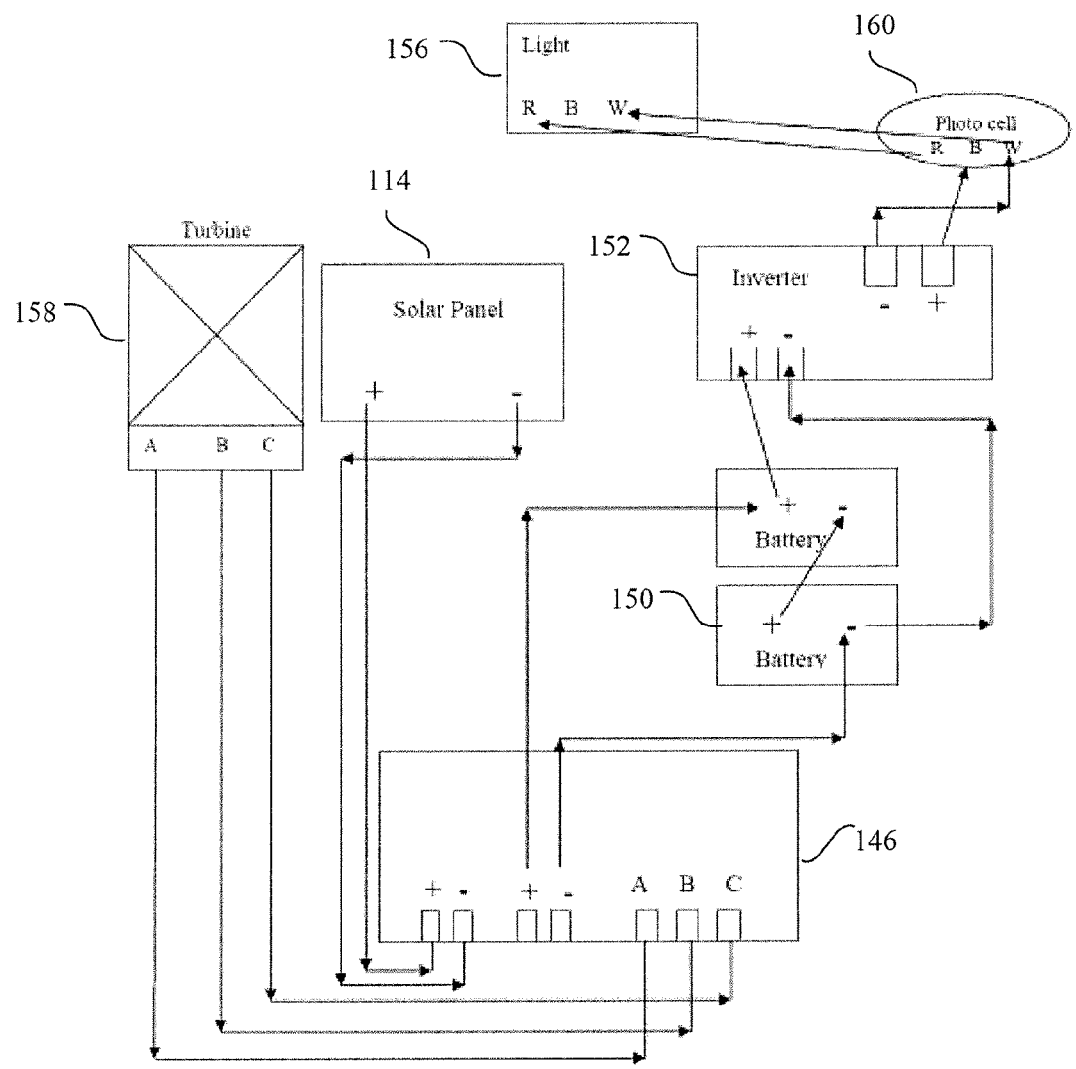
FIG. 32 is a wiring schematic according to one embodiment of the present invention.

FIG. 32 is a wiring schematic according to one embodiment of the present invention. Turbine component 142, which includes rotary component 112 and alternator 142, generates current which flows to hybrid solar/wind charge controller 146. Similarly, solar energy panel assembly 114 gathers energy from sunlight and converts the energy into electricity which flows to charge controller 146. From charge controller 146, the current enters the battery 150. To power light 156, current travels from battery 150 to inverter 152. From inverter 152, the current travels to light 156. Photo cell 160 controls the flow of electricity between inverter 152 and light 156, preventing flow of electricity when ambient light levels are above a certain pre-programmed or pre-set level, and allowing flow of electricity when ambient light levels are below a certain pre-programmed or pre-set level.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A light fixture comprising: at least one vertical-axis wind turbine adapted to generate electricity for powering said light fixture; at least a first plate and a second plate positioned above and below said at least one turbine, respectively; a light assembly comprising at least one light emitting member; a solar panel adapted for collecting solar radiation and converting said solar radiation into electricity for powering said light fixture; a power storage unit for storing electricity generated by said solar panel and said turbine; a controller interconnected to said turbine, said solar panel, said power storage unit, and said light assembly, where said controller is programmed to control the flow of electricity between said turbine, said solar panel, said power storage unit, and said light assembly; one or more support fins supporting said plates above and below said at least one turbine; wherein each of the series of plates comprises a thick central region and a thin peripheral region.

2. The light fixture of claim 1, wherein central region tapers radially in thickness from a series of a first set of points located centrally a distance from the center to a series of a second set of points located a greater distance from the center than the first set of points, and wherein the thin peripheral region is of constant width.

3. The light fixture of claim 1, wherein said at least one turbine comprise a Savonius turbine.

4. The light fixture of claim 1, wherein the light emitting member is positioned to direct light downwardly from said light fixture.

5. The light fixture of claim 4, wherein the solar assembly is positioned to face upwardly from said light fixture.

6. The light fixture of claim 1, wherein said controller is programmed to store electricity generated by said turbine and said solar panel in the during the daytime and provide energy from said power storage unit to said light assembly during the nighttime.

7. The light fixture of claim 6, wherein said controller is programmed to provide energy to said light fixture at a constant rate.

8. The light fixture of claim 7, further comprising an inverter for converting alternating current to direct current.

* * * * *